(12) United States Patent
Takeda

(10) Patent No.: US 9,767,782 B2
(45) Date of Patent: Sep. 19, 2017

(54) ACOUSTIC AIR FLOW RESISTIVE ARTICLE AND METHOD OF MAKING

(75) Inventor: Satoshi Takeda, Sagamihara (JP)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 1665 days.

(21) Appl. No.: 12/669,849

(22) PCT Filed: Aug. 13, 2008

(86) PCT No.: PCT/US2008/073022
§ 371 (c)(1),
(2), (4) Date: Jan. 20, 2010

(87) PCT Pub. No.: WO2009/032495
PCT Pub. Date: Mar. 12, 2009

(65) Prior Publication Data
US 2010/0203305 A1      Aug. 12, 2010

(30) Foreign Application Priority Data
Aug. 31, 2007   (JP) ................................ 2007-226567

(51) Int. Cl.
| D04H 1/54 | (2012.01) |
| G10K 11/162 | (2006.01) |
| B60R 13/08 | (2006.01) |
| D04H 3/14 | (2012.01) |
| D04H 3/16 | (2006.01) |
| D04H 1/56 | (2006.01) |

(52) U.S. Cl.
CPC ............ *G10K 11/162* (2013.01); *B60R 13/08* (2013.01); *D04H 1/54* (2013.01); *D04H 1/56* (2013.01); *D04H 3/14* (2013.01); *D04H 3/16* (2013.01); *B60R 13/083* (2013.01); *B60R 13/0815* (2013.01)

(58) Field of Classification Search
USPC .................. 442/361, 364, 400, 415; 428/219
See application file for complete search history.

(56) References Cited

U.S. PATENT DOCUMENTS

| 4,813,948 A | 3/1989 | Insley |
| 5,286,929 A * | 2/1994 | Kazama et al. ............. 442/364 |
| 6,145,617 A | 11/2000 | Alts |

(Continued)

FOREIGN PATENT DOCUMENTS

| JP | 9216303 | 8/1997 |
| JP | 10203268 | 8/1998 |

(Continued)

*Primary Examiner* — Jeremy R Pierce

(57) ABSTRACT

An acoustic air flow resistive article and a method of making same. The acoustic air flow resistive article can include melt blown fibers having a fiber diameter of no greater than 10 μm and binder fibers dispersed amongst the melt blown fibers and at least partially melt-adhered to the melt blown fibers. The melt blown fibers can be formed of a resin having a first melting point, and the surface of the binder fibers can be at least partially formed of a resin having a second melting point that is less than the first melting point. The method can include mixing the melt blown fibers and the binder fibers to form a web, and pressing the web at a temperature that is less than the first melting point and greater than the second melting point.

20 Claims, 2 Drawing Sheets

(56) References Cited

U.S. PATENT DOCUMENTS

| | | |
|---|---|---|
| 6,251,498 B1 | 6/2001 | Fukushima et al. |
| 6,589,643 B2 | 7/2003 | Okada et al. |
| 6,720,068 B1 | 4/2004 | Vanbemmel et al. |
| 6,720,069 B1 | 4/2004 | Murakami et al. |
| 7,476,632 B2 | 1/2009 | Olson |
| 2001/0050196 A1 | 12/2001 | Okada et al. |
| 2004/0197155 A1 | 10/2004 | Robinson et al. |
| 2005/0026527 A1* | 2/2005 | Schmidt et al. ............... 442/400 |
| 2005/0042518 A1* | 2/2005 | Kinn et al. .................... 442/118 |
| 2006/0214474 A1* | 9/2006 | Omiya et al. ................. 296/198 |

FOREIGN PATENT DOCUMENTS

| | | |
|---|---|---|
| JP | 2000/516175 | 5/2000 |
| JP | 2002/505209 | 2/2002 |
| JP | 2003/49351 | 2/2003 |
| JP | 2003201707 | 7/2003 |
| JP | 2004183179 | 7/2004 |
| JP | 2004271797 | 9/2004 |
| JP | 2005335279 | 12/2005 |
| WO | 99/44817 | 9/1999 |

\* cited by examiner

ACOUSTIC AIR FLOW RESISTIVE ARTICLE AND METHOD OF MAKING

CROSS REFERENCE TO RELATED APPLICATIONS

This application is a national stage filing under 35 U.S.C. §371 of PCT/US2008/073022, filed Aug. 13, 2008, which claims priority to Japan Application No. JP 2007-226567, filed Aug. 31, 2007, the disclosure of which is incorporated by reference in its entirety herein.

FIELD

The present disclosure generally relates to an acoustic air flow resistive article, a production process thereof, and a sound-absorbing member using the acoustic air flow resistive article.

BACKGROUND

Sound-proofing materials and sound-absorbing materials are used in various settings to suppress noise. For example, dashboard insulators and floor insulators can be used as sound-absorbing and sound-proofing materials for automobile interiors to suppress engine room noise or suppress noise entering from outside the vehicle. In some existing systems, felt and other types of non-woven fabrics or moldable porous resins (e.g., composed of urethane foam) are used for these sound-absorbing materials due to their low cost. In addition, in some existing systems, required levels of sound-absorbing performance are obtained by increasing the thickness of these materials to enhance noise absorbing effects.

Patent Document 1 (Published Japanese Translation No. 2002-505209 of PCT International Publication No. WO 99/44817) describes a structure in which a second fiber layer composed of melt blown microfibers is laminated onto a first fiber layer composed of a non-woven fabric or plastic foam.

Patent Document 2 (Japanese Patent Application Laid-open No. 2003-49351) describes an automotive sound-absorbing material in which a melt blown, microfine fiber non-woven fabric is laminated onto one side of a polyester fiber non-woven fabric.

SUMMARY

A first aspect of the present disclosure provides an acoustic air flow resistive article. The acoustic air flow resistive article can include melt blown fibers having a fiber diameter of no greater than 10 μm and binder fibers dispersed amongst the melt blown fibers and at least partially melt-adhered to the melt blown fibers. The melt blown fibers can be formed of a resin having a first melting point, and the surface of the binder fibers can be at least partially formed of a resin having a second melting point that is less than the first melting point. The acoustic air flow resistive article can include a solidity of at least 10% and a weight per unit surface area that ranges from about 50 g/m² to about 250 g/m².

A second aspect of the present disclosure provides a method of making an acoustic air flow resistive article. The method can include providing melt blown fibers having a fiber diameter of no greater than 10 μm and providing binder fibers. The melt blown fibers can be formed of a resin having a first melting point, and the surface of the binder fibers can be at least partially formed of a resin having a second melting point that is less than the first melting point. The method can further include mixing the melt blown fibers and the binder fibers to form a web having a weight per unit surface area of about 50 g/m² to about 250 g/m², and pressing the web at a temperature that is less than the first melting point and greater than the second melting point such that the solidity of the web is at least about 10%.

A third aspect of the present disclosure provides a sound-absorbing member. The sound-absorbing member can include a sound-absorbing material having a surface adapted to face a sound source, and an acoustic air flow resistive article coupled to the surface of the sound-absorbing material.

Other features and aspects of the disclosure will become apparent by consideration of the detailed description and accompanying drawings.

DETAILED DESCRIPTION

Figure 1:
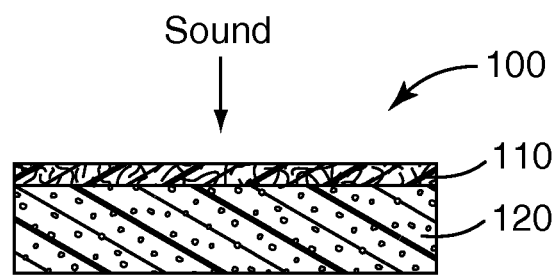
FIG. 1 is a cross-sectional view of a sound-absorbing member according to one embodiment of the present disclosure, the sound-absorbing member including an acoustic air flow resistive article and a sound-absorbing material.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "supported," and "coupled" and variations thereof are used broadly and encompass both direct and indirect supports, and couplings. Further, the term "coupled" is not restricted to physical or mechanical couplings. It is to be understood that other embodiments may be utilized, and structural or logical changes may be made without departing from the scope of the present disclosure.

The present disclosure generally relates to an acoustic air flow resistive article having air flow resistance and can be capable of improving the acoustic properties of other sound-absorbing members by being coupled to (e.g., by laminating onto) the surface thereof; a production process thereof; and a sound-absorbing member comprising the acoustic air flow resistive article.

In some applications, such as in vehicles where shape and space are restricted and the use of lightweight materials is required, it can be difficult to obtain adequate noise suppression effects using felt and other conventional materials alone.

In sound-absorbing materials described in the aforementioned Patent Documents 1 and 2, each of the laminates are composed only of melt blown fiber layers, and the materials have restorability even after being pressed and adjusted for air flow rate due to the resiliency of the fiber layer. As a result, it is generally not easy to maintain the fiber layer at a constant thickness. The inventors of the present disclosure have discovered that this can make it difficult to control and maintain stable air flow characteristics, and that air flow resistance values can be affected by factors such as fiber diameter, density of the fiber layer, and/or thickness of the fiber layer.

Some embodiments of the present disclosure provide an acoustic air flow resistive article that is lightweight, thin and easily handled, and is capable of stably adjusting air flow resistance of a sound-absorbing material and improving the sound-absorbing performance thereof by being coupled to the surface of various sound-absorbing materials.

According to the acoustic air flow resistive article of a first aspect of the present disclosure, since solidity and weight per unit surface area are adjusted to predetermined values, a lightweight and thin article can be obtained that has high air flow resistance. In addition, since microfine melt blown fibers and binder fibers are included and partially melt-adhered, the fiber structure can be fixed, making it possible to provide stable air flow resistance characteristics while facilitating handling.

According to a manufacturing method of an acoustic air flow resistive article according to a second aspect of the present disclosure, by mixing microfine melt blown fibers having a fiber diameter of 10 μm or less with binder fibers followed by pressurizing at a temperature at which at least a portion of the binder fibers melt and controlling the thickness during pressurization, air flow resistance can be easily adjusted, thereby providing the acoustic air flow resistive article of a first aspect of the present disclosure. The thickness and fiber structure of the pressed article can be fixed by the melted binder fibers to create an air flow resistive article having stable air flow resistance characteristics.

According to a sound-absorbing member according to a third aspect of the present disclosure, when the lightweight and thin acoustic air flow resistive article according to a first aspect of the present disclosure is coupled to a sound-absorbing material, high air flow resistance characteristics of the acoustic air flow resistive article can be controlled, and can improve sound-absorbing characteristics without excessively increasing weight or volume.

Acoustic Air Flow Resistive Article

The acoustic air flow resistive article of the present disclosure can generally be in the form of a web. In some embodiments, the acoustic air flow resistive article can be in the form of a film or a membrane.

The acoustic air flow resistive article of the present disclosure can be comprised of melt blown fibers and binder fibers. The binder fibers can be dispersed among the melt blown fibers, and can be at least partially melt-adhered by the melt blown fibers to adjust the weight per unit surface area and solidity of the acoustic air flow resistive article.

The term "binder fibers" generally refers to fibers of which at least a portion are melt-adhered to the melt blown fibers and are able to demonstrate the function of a binder.

In addition, the term "melt blown fibers" generally refers to a fibrous material fabricated using a melt blowing method from a resin having a melting point greater than the melt-adhered portion of the binder fibers. Furthermore, this "melt blowing method" generally refers to a method for processing fibers to have a narrow fiber diameter by melting a resin material and spraying a high-temperature air flow onto a fibrous resin extruded from a nozzle.

The term "solidity" generally refers to a value determined by dividing the bulk density of a web by the density of the material that composes the web, and is expressed as a percentage. This solidity serves as an indicator of web filling, sealability, air flow and the like. Details regarding the measuring method thereof are described hereinafter.

The acoustic air flow resistive article can be used by coupling (e.g. by laminating) directly or indirectly onto the surface of a sound-absorbing material and the like, and can be a relatively thin web article that improves the sound-absorbing characteristics of the sound-absorbing material by adjusting the air flow resistance thereof. Although the acoustic air flow resistive article can be used alone, the sound-absorbing effects can be improved by coupling the acoustic air flow resistive article to a sound-absorbing material, particularly, on the side of the sound-absorbing material facing the sound source. As a result, the air flow resistance of the sound-absorbing material can be made to have a high air flow resistance substantially equal to that of the acoustic air flow resistive article. Namely, the air flow resistance value can be made to be constant regardless of the type of sound-absorbing material with which it is combined.

In some embodiments, the acoustic air flow resistive article can be coupled directly or indirectly to a sound-absorbing layer. The sound-absorbing layer can include, but is not limited to, one or more of a felt layer, other nonwoven fabrics, an air layer, other suitable sound-absorbing materials, or combinations thereof.

The acoustic air flow resistive article and the sound-absorbing material can be coupled to a substrate, such as a vehicle body, to provide sound absorption.

The following provides a more detailed explanation of embodiments of the acoustic air flow resistive article of the present disclosure.

In some embodiments of the present disclosure, the acoustic air flow resistive article has melt blown fibers having a fiber diameter of 10 μm or less, and binder fibers dispersed in the melt blown fibers and at least partially melt-adhered to the melt blow fibers, wherein the solidity of the article is at least 10% and the weight per unit surface area is about 50 g/m$^2$ to about 250 g/m$^2$.

In addition, in some embodiments, the air flow resistance (also sometimes referred to herein as "air permeability") of the acoustic air flow resistive article can be adjusted by adjusting the values for weight per unit surface area and solidity. In embodiments in which the weight per unit surface area is at least about 50 g/m$^2$ and the solidity is at least about 10%, an air flow resistance can be obtained that is greater than that of felt and other conventional sound-absorbing materials. For example, in some embodiments, a value of at least about 600 Pa*s/m can be obtained for air flow resistance.

Furthermore, in embodiments in which the weight per unit surface area is less than about 50 g/m$^2$, the acoustic air flow resistive article can become excessively thin, adequate strength may be unable to be obtained, and the density of the article can tend not to be uniform. As a result, in some embodiments, the weight per unit surface area is at least about 50 g/m$^2$, which can facilitate ease of handling and can obtain uniform article density. In some embodiments, the weight per unit surface area is at least about 100 g/m$^2$, and in some embodiments, at least about 150 g/m². In some embodiments, the weight per unit surface area is no greater than about 250 g/m².

As mentioned above, in some embodiments, the air flow resistance is adjusted by adjusting the values of weight per unit surface area and solidity. In general, the higher the solidity, the lower the void ratio in the acoustic air flow resistive article and the higher the air flow resistance that can be obtained. In some embodiments, solidity can be adjusted to at least about 15%, and in some embodiments, at least about 18%. In addition, in embodiments in which solidity is constant, air flow resistance can be increased by increasing the weight per unit surface area. However, if the air flow resistance exceeds about 2500 Pa*s/m, sound reflection can occur in the acoustic air flow resistive article as a result of the occurrence of sound-proofing at high-frequency ranges, for example, at frequency ranges of at least about 3000 Hz, which can lead to a decrease in sound-absorbing characteristics. Thus, in the case of making the weight per unit surface area about 250 g/m², for example, solidity can be 15% or less. On the other hand, in the case of making the weight per unit surface area 150 g/m² or less, for example, solidity can be at least about 20%.

Furthermore, in some embodiments, air flow resistance is at least about 600 Pa*s/m, in some embodiments, at least about 700 Pa*s/m, and in some embodiments, at least about 1000 Pa*s/m. In some embodiments, for example to obtain satisfactory sound-absorbing characteristics even at high-frequency ranges of at least about 3000 Hz as previously described, air flow resistance can be about 2500 Pa*s/m or less, and in some embodiments, about 2200 Pa*s/m or less.

Although solidity can be adjusted using various methods, it can typically be adjusted by adjusting the thickness of the acoustic air flow resistive article, for example, by compressing the acoustic air flow resistive article at the time of production, as will be subsequently described. In some embodiments, the thickness of the acoustic air flow resistive article of the present disclosure can be made to be no greater than about 3 mm, in some embodiments, no greater about 2 mm, and in some embodiments, no greater than about 1 mm. Furthermore, in some embodiments, the thickness of the acoustic air flow resistive article can be at least about 0.3 mm, and in some embodiments, at least about 0.5 mm in order to obtain adequate strength thereof.

Since the acoustic air flow resistive article of the present disclosure has binder fibers dispersed in and melt-adhered to high melting point melt blown fibers, the structure of the melt blown fibers can be fixed resulting in the demonstration of stable air flow resistance characteristics.

In some embodiments, the content of the binder fibers per unit surface area of the acoustic air flow resistive article can be at least about 1 g/m², and in some embodiments, can be at least about 5 g/m². If the content is less than 1 g/m², the amount of binder can be inadequate, and can inhibit adequate melt-adhesion and stable fixation of the melt blown fiber structure, and can inhibit the maintenance of a constant air flow resistance due to recovery of the thickness of the article during use. On the other hand, if the amount of the binder is excessively high, the effect of enhancing air flow resistance by the melt blown fibers can be diminished. As a result, in some embodiments, the content of the binder fibers is no greater than about 40 g/m², and in some embodiments, is no greater than about 30 g/m².

The melt blown fibers are fibers that can be spun into microfine fibers by melt blowing, and there are no limitations thereon provided they have a higher melting point than a melting point of at least a portion of the surface of the binder fibers. For example, the melt blown fibers can be selected from thermoplastic polymers such as polyethylene terephthalate (PET), polyethylene butylenes terephthalate (PBT), polyethylene-1,4-cyclohexane dimethanol (PCT), polylactic acid (PLA) and/or polypropylene (PP), polyacrylonitrile, polyacetate and polyamide-based resins. Among these, PET and PP can be useful due to their cost, processing ease, and the like. Moreover, PP can be useful from the viewpoint of weight reduction due to its low specific gravity.

Furthermore, in the case of using a high-temperature step such as hot pressing as a method of, for example, laminating an acoustic air flow resistive article of the present disclosure onto a sound-absorbing material in a subsequent step, it can be useful for the fibers of the acoustic air flow resistive article to have a comparatively high melting point. In some embodiments, the melt blown fibers can have a melting point of at least about 180° C. Examples of such fibers include, but are not limited to, high ester-based fibers such as polyethylene butyl phthalate (PBT) and amide-based fibers such as Nylon 6, Nylon 11 or Nylon 66. Furthermore, the raw material of the melt blown fibers can be formed of a single material or a mixture of a plurality of resin materials.

In some embodiments, the diameter of the melt blown fibers is no greater than about 10 µm, in some embodiments, no greater than about 5 µm, and in some embodiments, no greater than about 3 µm. Such microfine fibers can be fabricated by melt-blow spinning. The use of microfine fibers can create a high air flow resistance at least partially because a more complex fiber structure having a finer pore diameter can be formed at the same weight per unit surface area.

Furthermore, the term "fiber diameter" referred to herein generally refers to the average of the fiber diameter in a cross-section perpendicular to the long axis of the fibers. A geometric fiber diameter can be measured by direct observation using SEM photomicrographs or the like. Also an effective fiber diameter can be theoretically determined from the measured value obtained by measuring the pressure loss of the web. A method of measuring the geometric fiber diameter is, for example, described in US Patent Application Publication No. 2004/00197155, the disclosure of which is hereby incorporated by reference. The specific calculation formula is described in greater detail in the Examples section below. As used herein, the term "fiber diameter" refers to the geometric fiber diameter.

At least a portion of the surface of the binder fibers has a lower melting point than the melt blown fibers. For example, the melting point of the low melting point portion of the binder fibers can be at least about 10° C., and in some embodiments at least about 20° C., lower than that of the melt blown fibers, and, for example, polyethylene terephthalate (PET), polyethelene (PE) or polypropylene (PP) can be used. In the case of using, for example, polybutylene terephthalate having a melting point in the vicinity of 220° C. for the melt blown fibers, polyethylene terephthalate (PET) having a melting point in the vicinity of 100° C., and the like, can be used for at least a portion of the binder fibers.

Furthermore, in the case of using the acoustic air flow resistive article in a vehicle sound-absorbing construction, the melting point of the binder fibers can be about at least about 90° C., in some embodiments, at least about 100° C., and in some embodiments, at least about 120° C., to allow the fibers to withstand environmental tests.

The binder fibers may have a fibrous shape, and there are no particular limitations on the cross-sectional diameter and length thereof. In some embodiments, short fibers can be used to enhance dispersibility. For example, staple fibers can be used that can be prepared by cutting spun fibers into lengths ranging from about 10 mm to about 100 mm.

Fibrous binder enables efficient melt adhesion with the melt blown fibers due at least in part to the high contact density therewith, thereby making it possible to suppress the required amount of low melting point binder.

The binder fibers are not required to be of a material having a uniform melting point throughout, but rather can at least be provided with a low melting point layer on the surface thereof. For example, fibers having a core-sheath structure in which only the sheath portion has a low melting point can be used. In some embodiments, during mixing with the melt blown fibers, only the low melting point binder of the sheath portion melts, while the core portion remains in the form of fibers together with the melt blown fibers. Thus, in some embodiments, the use of such binder fibers having a core-sheath structure can improve air flow resistance without disturbing the characteristic of the melt blown fibers.

In any case, the partially molten binder fibers can be melted and adhered to the melt blown fibers and can enhance air flow resistance of high melting point melt blown fibers. In addition, stable air flow resistance characteristics can be provided as a result of being able to fix the melt blown fiber structure. In addition, increasing the stability of the air flow resistance characteristics can facilitate handling of the acoustic air flow resistive article.

Sound-Absorbing Member

The acoustic air flow resistive articles of the present disclosure can be used to form sound-absorbing members (e.g., laminated sound-absorbing members) by coupling the acoustic air flow resistive article to sound absorbing materials.

FIG. 1 shows a sound-absorbing member 100 according to one embodiment of the present disclosure. The sound-absorbing member 100 comprises a sound-absorbing material 120 and an air flow resistive article 110 coupled onto a surface of the sound-absorbing material 120, for example, by laminating. The acoustic air flow resistive article 110 generally does not demonstrate much sound absorption alone. However, as shown in FIG. 1, by coupling the acoustic air flow resistive article 110 to the surface of a sound-absorbing material 120, a sound-absorbing member 100 can be formed, and the sound-absorbing characteristics of the sound-absorbing material 120 can be improved.

Here, "surface" refers to the side at which the sound to be absorbed enters, namely, the side facing the sound source. The air flow resistance of the entire sound-absorbing member can be determined by that of the acoustic air flow resistive article, for example, in embodiments in which the acoustic air flow resistive article having a high air flow resistance is provided on the surface of the sound-absorbing member.

Furthermore, there are no limitations on the type of sound-absorbing material 120 to which the acoustic air flow resistive article 110 is coupled, and various sound-absorbing materials can be used. For example, not only conventional sound-absorbing materials such as felt or urethane foam, but also various other sound-absorbing materials can be used. Further, combined or complex plural materials including another melt-blown fiber layer can be used. When sound-absorbing materials having lower air flow resistance than the acoustic air flow resistive article are used, the effect of coupling the acoustic air flow resistive article can be particularly obtained. There is no limitation of the thickness of the sound-absorbing materials. For example, the thickness can vary from several millimeters to several tens of millimeters, and the thickness can be changed depending on the application.

Figure 2:
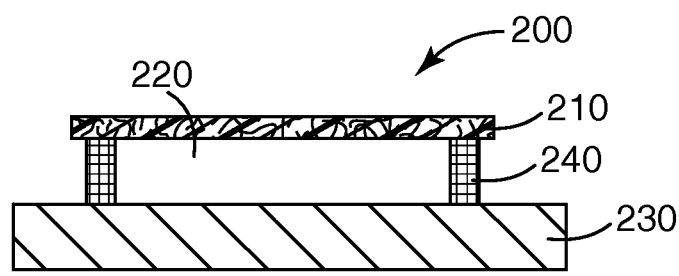
FIG. 2 is a cross-sectional view of a sound-absorbing member according to another embodiment of the present disclosure, the sound-absorbing member including an acoustic air flow resistive article and an air layer as a sound-absorbing material.

FIG. 2 shows a sound-absorbing member 200 according to another embodiment of the present disclosure. The sound-absorbing member 200 comprises an acoustic air flow resistive article 210 and an air layer 220. The air layer 220 serves as the sound-absorbing material, and the sound-absorbing member 200 can further include or be coupled to a portion of a substrate member 230 (e.g., a vehicle body). The sound-absorbing member 200 can also further include or be coupled to supporting materials 240, which are provided between the acoustic air flow resistive article 210 and the substrate member 230. Various spacers such as mesh materials or honeycombs having a high degree of air permeability can be used as the supporting materials 240, as will be described with respect to the embodiment in FIG. 3.

Figure 3:
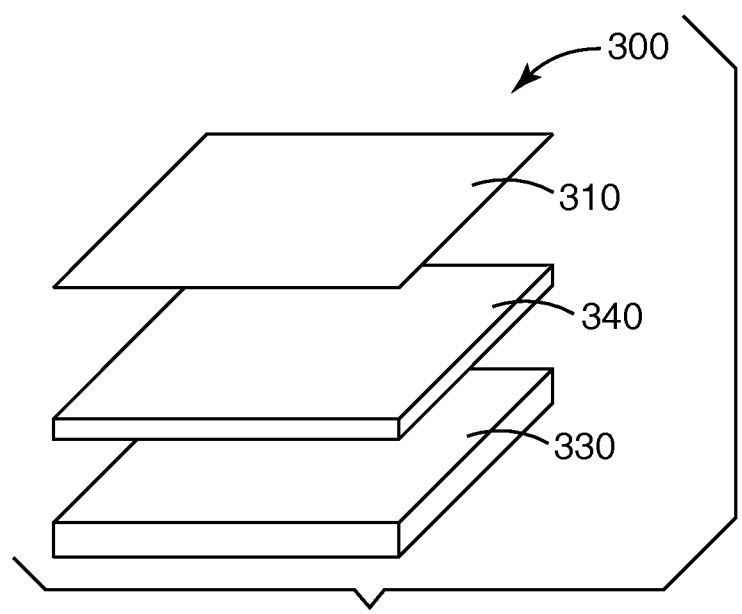
FIG. 3 is an exploded view of a sound-absorbing member according to another embodiment of the present disclosure, the sound-absorbing member including an acoustic air flow resistive article and a spacer as a sound-absorbing material.

FIG. 3 shows an exploded view of a sound-absorbing member 300 according to another embodiment of the present disclosure. The sound-absorbing member 300 comprises an acoustic air flow resistive article 310 coupled to a substrate member 330 using a supporting material 340. Each of the substrate member 330 and the supporting material 340 can form a portion of or be coupled to the sound-absorbing member 300. In the embodiment illustrated in FIG. 3, the supporting material 340 is in the form of a spacer. By way of example only, in the embodiment illustrated in FIG. 3, the spacer 340 can include a honeycomb made of metal films, paper, resin film, or the like, and having a layer thickness of 2 mm to 20 mm, partition wall having thickness of 0.5 mm to 1 mm and a cell pitch of 5 mm to 20 mm. In this case, an extremely lightweight sound-absorbing member 300 can be obtained.

A sound-absorbing member obtained in this manner is able to demonstrate high sound-absorbing characteristics over a wide range of wavelengths, for example, from about 100 Hz to about 3000 Hz.

Manufacturing Process of Acoustic Air Flow Resistive Article

The production process of the acoustic air flow resistive article of the present disclosure consists of first mixing melt blown fibers having a particle diameter of no greater than 10 μm with binder fibers, and forming a web having a weight per unit surface area of 50 to 250 g/m². In this step, an ordinary melt blowing process can be used to blow the binder fibers so as to directly converge with an air flow containing blown melt blown fibers, and form a web in which the binder fibers are substantially uniformly dispersed among the melt blown fibers. The binder fibers can be blown together by highly pressurized air flow after sleaving fibers with a rotating body such as a Rikken roll. Comparatively short fibers can be used to improve dispersibility of the binder fibers. In addition, the weight per unit surface area can be adjusted with the amount of each fiber blown into the compressed gas flow.

The process of mixing melt blown fibers with binder fibers is not limited by the above-mentioned process. For example, the following process can be used, which is described in U.S. Pat. No. 4,813,948, the disclosure of which is hereby incorporated by reference. First, a melt blown fiber web can be prepared by using a conventional melt blown process. Then, a combined web can be formed by introducing the melt blown fiber web in an air-laying apparatus at a feed roll to a lickerin with binder fibers. The lickerin can divellicate the melt blown fiber web. In some embodiments, the melt blown fiber web can be coated with a surfactant at least partially before introducing the melt blown fibers to the air-laying apparatus.

Next, the resulting combined web can be compressed by pressing from above and below in the direction of the thickness thereof at a temperature at which at least the surfaces of the binder fibers melt to form a combined web having a solidity of at least about 10%. There are no limitations on the heating method, and various methods, such as the use of a lamp or the use of a heater can be used. In addition, any method can be used for pressing, such as the use of a pressing machine or pressing rollers. In some embodiments, the combined web can be heated first and then pressed. In some embodiments, heating and pressurization can be carried out simultaneously, for example, using an ordinary calendering step. The heating conditions can be such that the heating temperature is a temperature at which at least a portion of the binder fibers melt but the melt blown fibers do not. Furthermore, it is not necessary for the entirety of the binder fibers to melt, but rather only the portion capable of adhering and fixing the fiber structure is required to be melted. In the case of using binder fibers having a core-sheath structure, conditions may be used under which only the sheath portion melts.

Furthermore, adjustment of solidity and air flow resistance in the method described above can be adjusted primarily with the thickness of the web during pressurization. For example, air flow resistance can be adjusted by adjusting the gap between pressing rollers. As a result, the thickness of the acoustic air flow resistive article of the present disclosure can be processed to be extremely thin, for example, in some embodiments, no greater than about 3 mm, in some embodiments, no greater than about 1 mm, and in some embodiments, no greater than about 0.5 mm.

In addition, the molten binder fibers can stably maintain air flow resistance characteristics of the acoustic air flow resistive article, even if subjected to various deformations and processing, because the binder fibers can firmly fix the fiber structure of the acoustic air flow resistive article.

As mentioned above, the acoustic air flow resistive article can be coupled (e.g., by laminating) to a sound-absorbing material to form a sound-absorbing member. One exemplary method for coupling the acoustic air flow resistive article to a surface of a sound-absorbing material (e.g., felt or urethane foam) includes integrating the ends of the acoustic air flow resistive article and the sound-absorbing material into a single unit. For example, the ends can be integrated by hot pressing the sound-absorbing member either before, during, or after cutting the sound-absorbing member to a predetermined pattern. Alternatively, each layer of the sound-absorbing member can be coupled together by other means (e.g., via adhesive materials).

Application of Acoustic Air Flow Resistive Article

A sound-absorbing member (e.g., a laminated sound-absorbing member) using the acoustic air flow resistive article of the present disclosure can be used in a wide range of applications including, but not limited to, automobile dashboard insulators, flow insulators, automobile roofing constructions, automobile door constructions, the walls and floors of residences, and various other applications requiring sound insulation. In particular, since the acoustic air flow resistive article of the present disclosure is generally thin and lightweight, it can be used in combination with various sound-absorbing materials. In addition, a sound-absorbing member using an air layer for the sound-absorbing material can be obtained, for example, by providing a gap (e.g., a fixed gap) between the acoustic air flow resistive article and a substrate (e.g., a vehicle body, automobile interior, etc.) to which the article is coupled.

EXAMPLES

The following working examples are intended to be illustrative and not limiting, and the present invention is not limited to the descriptions of these examples. First, an explanation is provided of the methods used to measure various values used to evaluate the following examples and comparative examples.

Weight Per Unit Surface Area: Units ($g/m^2$)

The weight per unit surface area of an acoustic air flow resistive article is measured in the following manner. Five acoustic air flow resistive articles cut to a size of 10 cm×10 cm were prepared, each sample was weighed, and the weight per unit surface area was determined from the average thereof.

Solidity: Units (%)

As indicated by the following equation, solidity is the value determined by dividing the bulk density of the acoustic air flow resistive article $\rho(web)$ by the density of the material that composes the acoustic air flow resistive article $\rho(material)$, and is expressed as a percentage. The bulk density of the acoustic air flow resistive article $\rho(web)$ is determined by dividing the weight per unit surface area of the acoustic air flow resistive article as determined using the method described above by the thickness. Furthermore, although the thickness of the acoustic air flow resistive article was measured in compliance with ASTM F778-88, the method for measuring the thickness is described hereinafter. In addition, material density $\rho(material)$ was determined from the raw material densities of the melt blown fibers and binder fibers provided by the manufacturers supplying the raw materials.

$$\text{Solidity}(S) = [\rho(web)/\rho(material)] \times 100 (\%) \quad \text{Equation 1}$$

$\rho(web)$: Bulk density of acoustic air flow resistive article
$\rho(material)$: Density of material composing acoustic air flow resistive article
where, $$\rho(material) = (\rho(h) \cdot X1/100) + (\rho(1) \cdot X2/100)$$

$\rho(h)$: Density of melt blown fibers
$\rho(1)$: Density of binder fibers
X1: Weight ratio of melt blown fibers (%)
X2: Weight ratio of binder fibers (%)

Air Flow Resistance ($Pa*s/m$)

Air flow resistance was measured based on the method described in ASTM C 522. Samples of the examples and comparative examples were cut into circles measuring 5.25 inches (13.33 mm) in diameter and fixed to a sample stand. Compressed air was supplied in the direction perpendicular to 100 $cm^2$ of the sheet surface followed by measurement of the resulting pressure difference in the direction perpendicular to the surface of the acoustic air flow resistive article.

Measurement of Sound Absorption

Sound-absorbing characteristics were measured using the two microphone method based on ASTM E 1050-98 ("Impedance and Absorption Using a Tube, Two Microphones and a Digital Frequency Analysis System"). The measuring range was 500 to 4000 Hz. The two microphone method measures the incident and reflected components of sound pressure within a tube with two microphones to determine the sound absorption coefficient.

In addition, the speech interference level (SIL) was determined using the resulting sound absorption coefficient data.

Speech interference level (SIL) is an indicator used to evaluate noise environments as to the degree to which speech can be succinctly comprehended in the presence of peripheral noise in the case of persons with normal hearing levels speaking directly in an unaided voice without using earphones or megaphone or the like. The SIL is defined as the arithmetic average of the noise sound pressure levels (A characteristics) of four bands having central frequencies of 500, 1000, 2000 and 4000 Hz.

Fiber Diameter

1. Geometric Fiber Diameter

The geometric fiber diameter for each web sample of each example or comparative example were determined by image analysis of SEM photomicrographs of a web specimen ("geometric diameter" herein means a measurement obtained by direct observation of the physical dimension of a fiber, as opposed, for example, to indirect measurements such as those that give an "effective fiber diameter").

Small web samples having a size of 1 cm×1 cm were cut from web samples. Each small web sample was then inserted into a scanning electron microscope S-3500N (Hitachi High Technology Inc., Japan) and was imaged using a beam energy of 20 keV, a working distance of approximately 15 mm, and a 0 degree sample tilt. Note that in the SEM analysis, metal coating of the sample was unnecessary. Electronic images taken at 500 and 1000 times magnification were used to measure fiber diameters. To perform the image analysis for each small web sample, five to ten fibers which appeared to be subject fibers were selected and the diameter of the subject fibers were measured by using the scale bar on the image. An average of the diameters was calculated.

2. Effective Fiber Diameter

The effective fiber diameter (EFD), determined according to the equation shown below was used for the fiber diameter of the melt blown fibers.

$$EFD = 27.68 \times \{[(A^{1.5} + 1254.37 \times A^{4.5}) \times L]/\Delta P/9.8\}^{0.5} \quad \text{Equation 2}$$

where, $\Delta P$ is the pressure loss (Pa), and

"A" is represented by the equation below:

$$A = BW/(R \times L)$$

BW: Sample weight (g)

R: Sample density (g/cm$^3$)

L: Sample thickness (mm)

Article Thickness: (mm)

The thickness of the acoustic air flow resistive article was measured using a measurement apparatus having two plates movable in a vertical direction (i.e., up-and-down) and a micrometer measuring the distance between the two plates according to ASTM F778-88. During measurement, five acoustic air flow resistive articles cut to a size of 10 cm×10 cm were prepared. A weight of 16 g was placed on the top plate of the measurement apparatus, and the top plate was then raised. An acoustic air flow resistive article sample was positioned at the center of the bottom plate of the measurement apparatus, and then the top plate was released from a height of 1.0 cm+/−0.2 cm. After waiting at least 3 seconds, the distance between the two plates was measured, namely, the thickness of the acoustic air flow resistive article was measured. The thickness of each sample was measured and an average for each article was obtained.

Example 1

Melt blown fibers having a fiber diameter of 5 µm were spun to a weight per unit surface area of 120 g/m$^2$ from PBT resin (DURANEX® PBT 2002 melt blown fibers, available from Win Tech Polymer ltd., Tokyo, Japan) in a melt blowing process. Binder fibers having a core-sheath structure having a fiber diameter of 2.2 denier and average fiber length of 38 mm, in which the core was made of PET having high temperature melting point of 260° C. and sheath was made of PET having low temperature melting point of 100° C. (TEIJIN-TETRON® TJO4C2 binder fibers, available from Teijin Fiber Ltd., Osaka, Japan), were used. The binder fibers were blown to 5 g/m$^2$ using binder fibers so as to merge with the fiber flow immediately after the above melt blown fibers were blown to produce a combined web having a total weight per unit surface area of 125 g/m$^2$. Namely, 4.0 wt % of the binder fibers were added to the total combined web. This combined web was crushed using a roller heated to 110° C. to obtain an acoustic air flow resistive article having a thickness of 0.5 mm. The solidity of this acoustic air flow resistive article was 18%.

This acoustic air flow resistive article was laminated onto PET felt having a weight per unit surface area of 325 g/m$^2$ and thickness of 7 mm to produce a laminated sound-absorbing member.

Example 2

A combined web having a weight per unit surface area of 130 g/m$^2$ and thickness of 0.9 mm was produced by mixing binder fibers at 10 g/m$^2$ into melt blown fibers. Namely, 7.7 wt % of the binder fibers were added to the total combined web. The solidity of this acoustic air flow resistive article was 11.0%. Other conditions were the same as those used in Example 1.

Example 3

A combined web having a weight per unit surface area of 127 g/m$^2$ and thickness of 0.5 mm was produced by mixing binder fibers at 10 g/m$^2$ into melt blown fibers. Namely, 7.9 wt % of the binder fibers were added to the total combined web. The solidity of this acoustic air flow resistive article was 20.8%. Other conditions were the same as those used in Example 1.

Example 4

A combined web having a weight per unit surface area of 142 g/m$^2$ and thickness of 1.0 mm was produced by mixing binder fibers at 30 g/m$^2$ into melt blown fibers. Namely, 21 wt % of the binder fibers were added to the total combined web. The solidity of this acoustic air flow resistive article was 11.2%. Other conditions were the same as those used in Example 1.

Example 5

A combined web having a weight per unit surface area of 250 g/m$^2$ and thickness of 1.7 mm was produced by mixing binder fibers at 5 g/m$^2$ into high melting point melt blown fibers. Namely, 2.0 wt % of the binder fibers were added to the total combined web.

The solidity of this acoustic air flow resistive article was 11.2%. Other conditions were the same as those used in Example 1.

Comparative Example 1

A sound-absorbing member composed of PET felt having a weight per unit surface area of 325 g/m² and thickness of 7 mm was used without using an acoustic air flow resistive article.

Comparative Example 2

A web having a weight per unit surface area of 118 g/m² and thickness of 1.8 mm composed only of melt blown fibers was produced without mixing with binder fibers. The solidity of the web was 4.9%. Other conditions were the same as those used in Example 1.

Comparative Example 3

A combined web having a weight per unit surface area of 138 g/m² and thickness of 2.9 mm was produced by mixing binder fibers at 30 g/m² into melt blown fibers. Namely, 22 wt % of the binder fibers were added to the total combined web. The solidity of the combined web was 3.7%. Other conditions were the same as those used in Example 1.

Comparative Example 4

A combined web having a weight per unit surface area of 375 g/m² and thickness of 2 mm was produced by mixing binder fibers at 15 g/m² into melt blown fibers. Namely, 4.0 wt % of the binder fibers were added to the total combined web. The solidity of the combined web was 3.7%. Other conditions were the same as those used in Example 1.

Comparative Example 5

A PET non-woven fabric having a fiber diameter of 44 µm, weight per unit surface area of 100 g/m² and thickness of 0.6 mm was produced using the Spanbond method instead of using melt blown fibers. Felt having a thickness of 7 mm was laminated onto this PET non-woven fabric.

Comparative Example 6

A PET non-woven fabric having a fiber diameter of 23 µm, weight per unit surface area of 90 g/m² and thickness of 0.6 mm was produced using the needle punch method instead of using melt blown fibers. Felt having a thickness of 7 mm was laminated onto this PET non-woven fabric.

Evaluation

Figure 4:
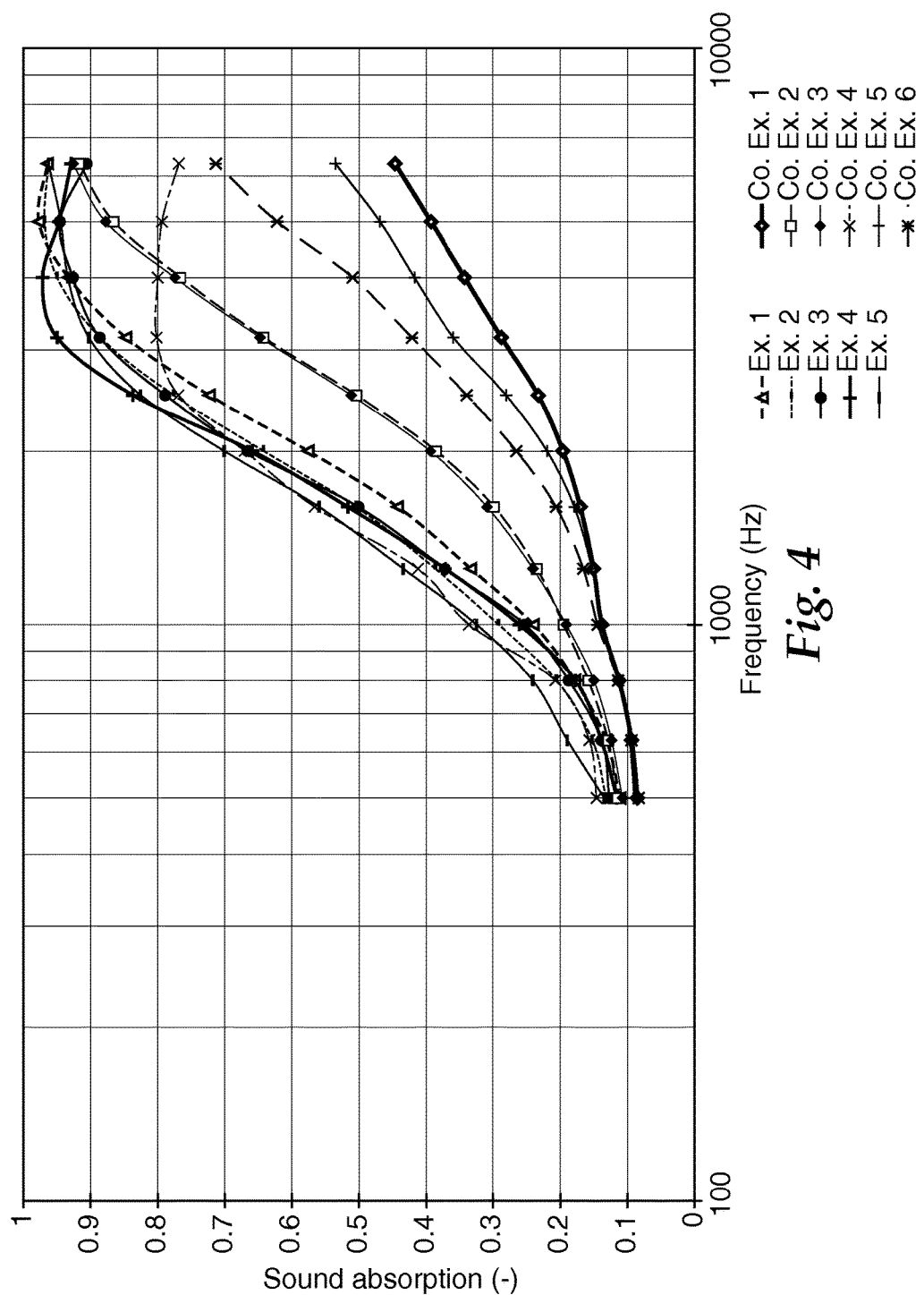
FIG. 4 is a graph showing the sound-absorbing characteristics of sound-absorbing members of examples and comparative examples of the present disclosure.

The conditions of each of the examples and comparative examples along with the sound-absorbing characteristics thereof are shown in Table 1 and FIG. 4.

The embodiments described above and illustrated in the figures are presented by way of example only and are not intended as a limitation upon the concepts and principles of the present disclosure. As such, it will be appreciated by one having ordinary skill in the art that various changes in the elements and their configuration and arrangement are possible without departing from the spirit and scope of the present disclosure. Various features and aspects of the present disclosure are set forth in the following claims.

TABLE 1

| | Weight per unit surface area (g/m²) | Thickness (mm) | Air permeability (Pa * s/m) | Solidity (%) | High melting point melt blown fiber diameter (µm)* | Sound absorption coefficient (—) | | | | |
|---|---|---|---|---|---|---|---|---|---|---|
| | | | | | | 500 Hz | 1000 Hz | 2000 Hz | 4000 Hz | SIL |
| Ex. 1 | 125 | 0.5 | 1267 | 18 | G: 4 EFD: 5 | 0.139 | 0.417 | 0.875 | 0.962 | 0.599 |
| Ex. 2 | 130 | 0.9 | 754 | 11.0 | G: 4 EFD: 5 | 0.158 | 0.377 | 0.837 | 0.947 | 0.580 |
| Ex. 3 | 127 | 0.5 | 1343 | 20.8 | G: 4 EFD: 5 | 0.118 | 0.387 | 0.815 | 0.949 | 0.567 |
| Ex. 4 | 142 | 1.0 | 979 | 11.2 | G: 5 EFD: 5 | 0.185 | 0.416 | 0.821 | 0.950 | 0.593 |
| Ex. 5 | 250 | 1.7 | 2193 | 11.2 | G: 4 EFD: 5 | 0.184 | 0.450 | 0.885 | 0.951 | 0.617 |
| Comp. Ex. 1 | — | — | — | — | — | 0.0745 | 0.182 | 0.416 | 0.774 | 0.362 |
| Comp. Ex. 2 | 118 | 1.8 | 184 | 4.9 | G: 4 EFD: 5 | 0.149 | 0.292 | 0.644 | 0.951 | 0.509 |
| Comp. Ex. 3 | 138 | 2.9 | 184 | 3.7 | G: 4 EFD: 5 | 0.142 | 0.299 | 0.638 | 0.966 | 0.511 |
| Comp. Ex. 4 | 375 | 2 | 4428 | 14.9 | G: 4 EFD: 5 | 0.186 | 0.657 | 0.758 | 0.681 | 0.571 |
| Comp. Ex. 5 | 100 | 0.6 | 18.4 | 12.7 | G: 42 EFD: 44 | 0.0941 | 0.189 | 0.443 | 0.812 | 0.385 |
| Comp. Ex. 6 | 90 | 0.6 | 55.2 | 11.5 | G: 18 EFD: 23 | 0.109 | 0.217 | 0.496 | 0.855 | 0.419 |

*"G" refers to geometric fiber diameter and "EFD" refers to effective fiber diameter.

What is claimed is:

1. A sound-absorbing member comprising:
   a sound-absorbing material having a surface adapted to face a sound source; and
   an acoustic air flow resistive article coupled to the surface of the sound-absorbing material, with the acoustic air flow resistive article comprising:
   melt blown fibers having a fiber diameter of no greater than 10 µm, the melt blown fibers being formed of a resin having a first melting point; and
   binder fibers dispersed amongst the melt blown fibers, through the thickness of the acoustic air flow resistive article, and at least partially melt-adhered to the melt blown fibers, the surface of the binder fibers being at least partially formed of a resin having a second melting point that is less than the first melting point,
   wherein the acoustic air flow resistive article has a solidity of at least 10% and a weight per unit surface area in the range of from about 50 g/m² to about 250 g/m².

2. The sound-absorbing member according to claim 1, wherein the thickness of the acoustic air flow resistive article is no greater than 2 mm.

3. The sound-absorbing member according to claim 1, wherein the air flow resistance of the acoustic air flow resistive article ranges from about 600 Pa*s/m to about 2500 Pa*s/m.

4. The sound-absorbing member according to claim 1, wherein the melt blown fibers comprise one or a plurality of fibers selected from polyester or amide fibers having a melting point of at least 180° C., and wherein the binder fibers comprise staple fibers in which at least a portion of the surface of the staple fibers has a melting point of at least 90° C. and less than 180° C.

5. The sound-absorbing member according to claim 1, wherein the binder fibers are included at a weight per unit surface area of about 1 g/m² to about 40 g/m².

6. The sound-absorbing member according to claim 1, wherein the binder fibers have a core-sheath structure and only the sheath portion of the binder fibers is melt-adhered to the melt blown fibers.

7. The sound-absorbing member according to claim 1, wherein the sound-absorbing material comprises an air layer.

8. The sound-absorbing member according to claim 2, wherein the sound-absorbing material comprises an air layer.

9. The sound-absorbing member according to claim 3, wherein the sound-absorbing material comprises an air layer.

10. The sound-absorbing member according to claim 4, wherein the sound-absorbing material comprises an air layer.

11. The sound-absorbing member according to claim 5, wherein the sound-absorbing material comprises an air layer.

12. The sound-absorbing member according to claim 6, wherein the sound-absorbing material comprises an air layer.

13. The sound-absorbing member according to claim 7, coupled to a substrate member, wherein the air layer is between the acoustic air flow resistive article and the substrate member.

14. The sound-absorbing member according to claim 8, coupled to a substrate member, wherein the air layer is between the acoustic air flow resistive article and the substrate member.

15. The sound-absorbing member according to claim 9, coupled to a substrate member, wherein the air layer is between the acoustic air flow resistive article and the substrate member.

16. The sound-absorbing member according to claim 10, coupled to a substrate member, wherein the air layer is between the acoustic air flow resistive article and the substrate member.

17. The sound-absorbing member according to claim 11, coupled to a substrate member, wherein the air layer is between the acoustic air flow resistive article and the substrate member.

18. The sound-absorbing member according to claim 12, coupled to a substrate member, wherein the air layer is between the acoustic air flow resistive article and the substrate member.

19. The sound-absorbing member according to claim 7, wherein the air layer serves as the sound-absorbing material.

20. A sound-absorbing member comprising:
    a sound-absorbing material having a surface adapted to face a sound source; and
    an acoustic air flow resistive article coupled to the surface of the sound-absorbing material, with the acoustic air flow resistive article comprising:
    melt blown fibers having a fiber diameter of no greater than 10 µm, the melt blown fibers being formed of a resin having a first melting point; and
    binder fibers substantially uniformly dispersed amongst the melt blown fibers and at least partially melt-adhered to the melt blown fibers, the surface of the binder fibers being at least partially formed of a resin having a second melting point that is less than the first melting point,
    wherein the acoustic air flow resistive article has a solidity of at least 10% and a weight per unit surface area in the range of from about 50 g/m² to about 250 g/m².

* * * * *